Feb. 23, 1937.  G. W. BAUGHMAN  2,071,722
ELECTROPNEUMATIC BRAKE
Filed June 12, 1934
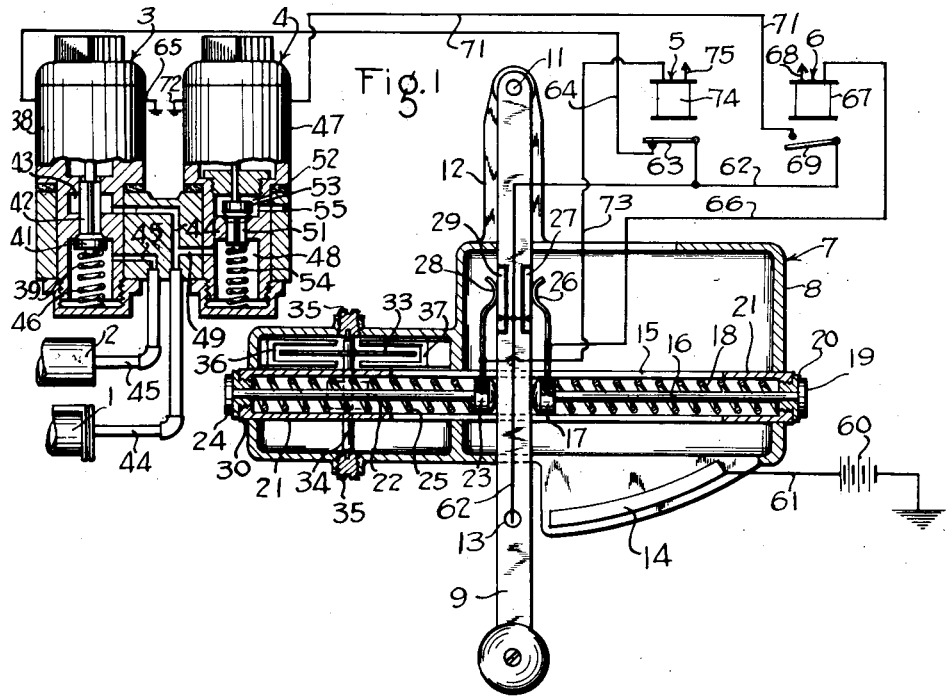
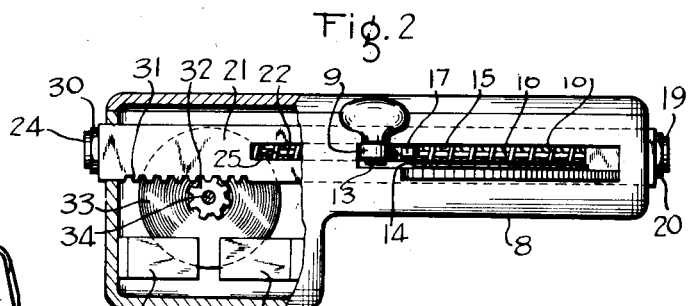
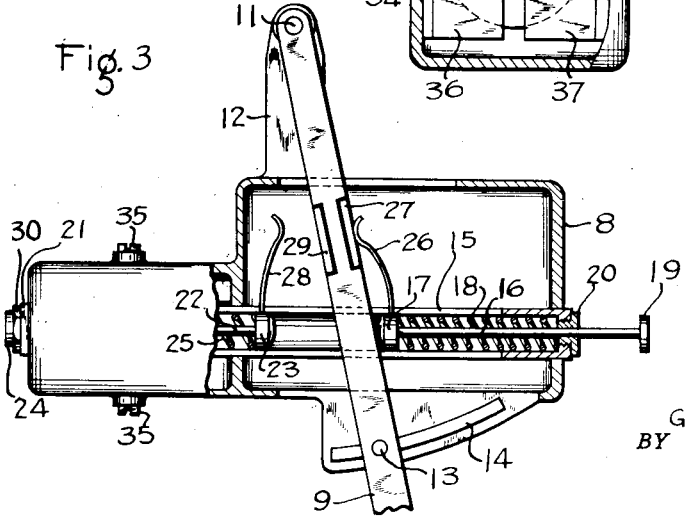
INVENTOR
GEORGE W. BAUGHMAN.
BY
Wm. M. Cady
ATTORNEY

UNITED STATES PATENT OFFICE 2,071,722

ELECTROPNEUMATIC BRAKE

George W. Baughman, Edgewood, Pa., assignor to The Westinghouse Air Brake Company, Wilmerding, Pa., a corporation of Pennsylvania Application June 12, 1934, Serial No. 730,230

14 Claims. (Cl. 303—20)

My invention relates to brake equipment for vehicles and more particularly to an electro-pneumatic brake equipment.

It has been proposed to provide a brake equipment having a brake valve device adapted, upon movement by the operator to a given position, to effect the supply of fluid under pressure to the brake cylinder until the brake cylinder pressure has been increased to a degree corresponding with the position of the brake valve handle, when the supply of fluid under pressure to the brake cylinder is automatically cut off, and, upon movement of the handle to another given position, to release fluid from the brake cylinder to a degree corresponding with the position of the brake valve handle, when the further release of fluid from the brake cylinder is cut off. This type of brake valve device is known as a self-lapping brake valve in which the self-lapping action operates on a pressure basis.

One object of my invention is to provide a brake equipment in which the operator controlled mechanism is of the self-lapping type and in which the self-lapping action operates on a time basis.

A more specific object of my invention is to provide an electro-pneumatic brake equipment in which the brake equipment is self-lapping on a time basis.

Another object of my invention is to provide an electro-pneumatic brake equipment in which the time of increasing or decreasing brake cylinder pressure is a function of the amount of movement of the brake control handle at the expiration of which time the brake is self-lapping.

Other objects and advantages of my invention will be apparent from the description of a specific embodiment thereof taken in conjunction with the accompanying drawing in which Fig. 1 is a diagrammatic view of apparatus and circuits illustrating one preferred embodiment of the invention, Fig. 2 is an elevational view of the controller, partly in section, and Fig. 3 is a plan view of the controller, partly in section, showing the controller handle in service position.

Referring to the drawing the numeral 1 represents a brake cylinder of a fluid pressure brake adapted to be supplied with fluid under pressure from the reservoir 2 in accordance with the operation of an application magnet valve device 3 and from which fluid under pressure is released by the operation of a release magnet valve device 4 that are controlled, respectively, by an application relay 5 and a release relay 6 in accordance with the operation of a controller 7. The controller 7 comprises a stationary casing 8 having a handle 9, pivotally mounted at 11 on a bracket 12 extending outwardly from the casing, and carrying a contact member 13 that is adapted to engage a contact segment 14 when the handle 9 is positioned in the service application zone.

A lap controlling device 15 is provided on the controller, comprising a tubular casing 21 that is movable with respect to the casing 8 and is provided with slots in its opposite sides through which the brake handle 9 extends. Means is provided for biasing the lap controlling device with respect to movements of the brake handle 9, and comprises a rod 16 provided with an abutment 17 for engaging the handle 9, and that is biased toward the central portion of the tubular casing 21 by a spring 18 pressing against the abutment 17 and having its outer end in engagement with a cap nut 20 in the outer end of the tube. The rod 16 extends through an opening in the cap nut 20, and is provided with a head 19 on its outer end to limit its movement toward the left. The opposite end of the casing 21 is provided with a rod 22 having an abutment 23 on the inner end thereof and a head 24 on the outer end thereof. The rod 22 extends through an opening in a cap nut 30 at the outer left hand end of the casing structure 21, and a biasing spring 25 is positioned between the cap nut 30 and the abutment 23 for forcing the abutment toward the right into engagement with the brake handle 9. Contact fingers 26 and 28 are carried, respectively, by the abutments 17 and 23 for engaging contact members 27 and 29, respectively, carried on the brake handle 9.

In order to provide a time delay action in the operation of the lap controlling device, after operation of the brake handle 9, a retardation device is provided which, as illustrated, comprises a rack 31 on the under side of the casing 21 for engaging the teeth of a pinion 32 mounted on the shaft 34 that is supported by the pivots 35. A metallic disc or vane 33 of electrically conducting material, such as copper or aluminum, is mounted on, and rotates with, the shaft 34, and is positioned between preferably permanent magnets 36 and 37. The desired amount of time lag between the movement of the lap controller 15 and the handle 9 may be provided by selecting the proper relation between the size of the metallic disc and strength of the permanent magnets, and also by interposing a gear train between the rack and pinion if found necessary.

The application magnet valve device 3 comprises a casing 38 provided in its lower portion with an application valve chamber 39, containing a valve 41 for controlling communication from valve chamber 39 to a port 42 and an outlet chamber 43, that is connected by a passage and pipe 44 to the brake cylinder 1. The valve chamber 39 is connected by a passage and pipe 45 to the reservoir 2, and a spring 46 is provided therein for biasing the valve 41 upwardly, toward its seated position, to insure closure of the valve unless it is actuated downwardly by energization of the magnet winding in the upper portion of the casing 38. The release magnet valve device 4 is provided with a casing 47 having an inlet chamber 48 in the lower portion thereof that is connected by the passage 49 to the passage and pipe 44, and connected by a passage 51 to the valve chamber 52. A valve 53, contained in the valve chamber 52, controls communication from the passage 51, opening into the inlet chamber 48, to chamber 52 and to the atmosphere through passage 55. The inlet chamber 48 contains a spring 54 for biasing the valve 53 to its unseated position to normally maintain open communication between the brake cylinder 1 and the atmosphere. The valve 53 is adapted to be actuated downwardly to its seated position upon energization of the magnet winding of the magnet valve device 4 in the upper part of the casing 47.

In the position of the brake handle 9 illustrated in Fig. 1, which is the running or brake release position of the equipment, the application relay 5, and the release relay 6, are both deenergized, since the contact member 13 is out of engagement with the conducting segment 14. The contact member 63 of the application relay is, therefore, in its circuit closing position, while the contact member 69 of the release relay is in its circuit interrupting position. If the operator desires to apply the brakes, the handle 9 is moved in a counter-clockwise direction with respect to the stationary casing 8 an amount dependent upon the desired degree of application of the brake, as, for example, to the position illustrated in Fig. 3. Upon engagement of the contact member 13 with the conducting segment 14, a circuit is completed from a source of energy, such as the battery 60, through conductor 61, conducting members 14 and 13, conductor 62, the contact member 63 of the relay 5, conductor 64 to the winding of the application magnet valve device 3, and by conductor 65 to ground and to the source of power 60, thus operating the application magnet valve to its lower position and permitting the flow of air under pressure from the reservoir 2 into the brake cylinder 1. Upon engagement of the contact member 13 with the conducting segment 14 a circuit is also completed through conductor 62, contact member 27 carried by the brake handle 9, finger 26, conductor 66, coil 67 of the release relay 6, and by conductor 68 to the source of power, thus operating the relay 6 to close a circuit through the contact member 69 extending from the conductor 62, conductor 71, the winding of the release magnet valve device 4, and conductor 72 to the source of power, thus energizing the release magnet valve to operate it downwardly to cut off communication from the brake cylinder 1 to the atmosphere through exhaust passage 55.

The coil springs 18 and 25 on opposite sides of the brake handle 9 tend to position the movable casing structure 21 of the lap controlling device so that its middle point is maintained in line with the handle 9. Upon movement of the brake handle 9 from the position shown in Fig. 1 to the position shown in Fig. 3, the abutment 17 and rod 16 are forced toward the right compressing the spring 18 and the pressure of the compressed spring acts to shift the casing structure 21 toward the right until the cap nut 20 engages the head 19. The retarding or dampening device, comprising the vane 33, introduces a time delay into the movement of the casing 21 the duration of which depends upon how far the brake handle 9 is moved from the position shown in Fig. 1. Upon completion of this movement the contact finger 28, carried by the abutment 23, engages the contact member 29, carried on the brake handle 9, completing a circuit through conductor 73, the winding 74 of the application relay 5, and conductor 75 to the source of power, thus energizing the relay 5 and causing movement of its contact member 63 upwardly to a circuit interrupting position to deenergize the magnet winding of the application magnet valve device 3, so that the valve 41 is moved to its seat by spring 46. Both the application magnet valve device 3 and the release magnet valve device 4 are now in their closed positions, thus maintaining the brake cylinder supply and release passages lapped.

Should the operator desire to apply the brakes with increased force, the brake handle 9 is moved further toward the right thus again separating the contact members 28 and 29 and deenergizing the application relay 5 which drops to its illustrated position and completes a circuit through the application magnet valve device 3, so that the valve 41 is moved to its open position and permits fluid under pressure to again flow from the reservoir 2 to the brake cylinder 1 to increase the degree of application of the brake. The amount of this increased application of the brake will depend upon the amount of movement of the brake handle 9 since the further the handle is moved the longer will be the time required to move the contact member 28 into engagement with the contact member 29, to again energize the application relay 5 and interrupt the circuit to the winding of the application magnet valve 3. If the operator desires a lesser degree of application of the brake, the brake handle 9 is moved toward the left, thus interrupting the circuit through contact members 26 and 27, deenergizing the release relay 6, and consequently the winding of the release magnet valve device 4, causing the valve 52 to open and permit the escape of fluid under pressure from the brake cylinder 1 to the atmosphere through exhaust port 51. When the handle 9 is moved toward the left, the spring 25 is compressed, thus biasing the casing structure 21 toward the left, to carry the contact member 26 in that direction until it again engages the contact member 27, at which time the release relay 6 is again energized to close a circuit for energizing the winding of the release magnet valve device 4, thus operating it to its closed position to maintain pressure within the brake cylinder 1.

It will be noted from the above description that a given movement of the brake handle 9 toward the right will cause the application magnet valve device 3 to be energized and operated to its open position for a specific time, at the expiration of which the application magnet valve device 3 is deenergized and closed. The release magnet valve device 4 will however remain energized thus maintaining the brakes applied. Subsequent movement of the brake handle 9 in the same direction will cause the application magnet valve device 3 to be again energized for times proportional to the amount of movement of the handle 9 to correspondingly increase the degree of application of the brake. A movement of the brake handle 9 in the opposite direction, that is, toward the left, will result in the deenergization of the release magnet valve device 4, thus permitting this valve to open for a duration of time that is proportional to the amount of movement of the handle 9 to correspondingly decrease the degree of application of the brake. Upon movement of the handle 9 to the left sufficiently to interrupt the circuit through the contact member 13 and the segment 14 the release relay 6 will be deenergized resulting in a complete release of the brake.

While I have illustrated and described one preferred embodiment of my invention it will be apparent to those skilled in the art that many changes in the circuits and apparatus described may be made within the spirit of my invention, and I do not wish to be limited otherwise than by the scope of the appended claims.

Having now described my invention, what I claim as new and desire to secure by Letters Patent, is:

1. In a brake equipment for vehicles, in combination, a brake cylinder, electrically operated valves for controlling the application and release of fluid under pressure to and from said brake cylinder, a brake handle for controlling the operation of said valves, an application relay and a release relay, means effective upon movement of the handle to a service position for effecting energization of said release relay to prevent release of said brake, and timing means effective at a predetermined time thereafter, dependent upon the amount of movement of said handle, for effecting energization of said application relay to prevent further increased application of said brake.

2. In a brake equipment for vehicles, in combination, a brake cylinder, electrically operated valves for controlling the flow of fluid under pressure to and from said brake cylinder, a brake handle for controlling the operation of said valves, means responsive to the movement of the handle to a service position for effecting an application operation of said valves, means biased upon movement of the handle for interrupting such operation, and retardation means associated therewith for introducing a time delay in the operation of said interrupting means that is substantially proportional to the amount of movement of said handle.

3. In a brake equipment for vehicles, in combination, a brake cylinder, electrically operated valves for controlling the flow of fluid under pressure to and from said brake cylinder, a brake handle for controlling the operation of said valves, means responsive to the movement of the handle to a service position for effecting an application operation of said valves, means biased upon movement of the handle for interrupting such operation after a predetermined time and for interrupting subsequent operations of said valves at predetermined times after the movement of said handle to effect greater or lesser brake application, said several predetermined times being substantially proportional to the amount of movement of said handle.

4. In a brake equipment for vehicles, electrically operable means for controlling the application and release of the brakes, a brake handle for controlling the energization of said electrically operable means, cooperating contact members effective for initiating operation of said electrically operable means in any service position of the handle, a lap controlling element biased to a predetermined position relative to the handle and a retarding device for delaying movement thereof to said predetermined position following movement of the handle, and means comprising cooperating contact members effective when said lap controlling element is in said predetermined position for holding the electrically operable means in lap condition.

5. In a brake equipment for vehicles, electrically operable means for controlling the application and release of the brakes, a brake handle for controlling the energization of said electrically operable means, cooperating contact members effective for initiating operation of the brakes when the handle is positioned in the application zone, a lap controlling device biased to a predetermined position relative to the handle, a retarding device for delaying movement thereof to said predetermined position following movement of the handle, and means comprising cooperating contact members effective when said lap controlling device is in said predetermined position for holding the electrically operable means in lap condition and effective, upon movement of said handle in the one or in the other direction within the application zone, to cause an increasing application or a decreasing application of the brakes.

6. In a brake equipment for vehicles, electrically operable means for controlling the application and release of the brakes, a brake handle for controlling the energization of said electrically operable means, cooperating contact members effective for initiating operation of said electrically operable means when the handle is positioned in the service application zone, a movable lap controlling device comprising a movable element, contact members carried thereby, biasing means for biasing said movable element toward a definite position relative to the handle, and time delay means for retarding the movement of said lap controlling device, said contact members being effective to maintain circuits for holding the electrically operable means in lap condition when said movable element is in said definite position.

7. In a brake equipment for vehicles, an electrically operable application valve and an electrically operative release valve for controlling the application and release of the brakes, a brake handle for controlling the energization of said electrically operable valves, an application relay biased to a circuit closing position, cooperating contact members effective for initiating operation of said application valve by said application relay when the handle is positioned in the application zone, a lap controlling device biased to a predetermined position relative to the handle and a time delay device for permitting slow movement thereof to said predetermined position following movement of the handle in either direction, and means comprising cooperating contact members effective when said lap controlling device is in said predetermined position for operating said application relay to effect closure of said application valve while holding the electrically operable means in lap condition.

8. In a brake equipment for vehicles, an electrically operable application valve and an electrically operable release valve for controlling the application and release of the brakes, a brake handle for controlling the energization of said electrically operable valves, an application relay biased to a circuit closing position, cooperating contact members effective for initiating operation of said application valve through said application relay when the handle is positioned in the application zone, a lap controlling device biased to a predetermined position relative to the handle, a time delay device for permitting slow movement thereof to said predetermined position following movement of the handle, means comprising cooperating contact members effective when said handle is positioned in the application zone for holding said release valve closed, and means comprising cooperating contact members effective when said lap controlling device is in said predetermined position for holding said application valve closed to maintain the brakes applied.

9. In a brake equipment for vehicles, electrically operable means for controlling the application and release of the brakes, a brake handle for controlling the energization of said electrically operable means, cooperating contact members effective for initiating operation of said electrically operable means in any service position of the handle, a lap controlling device comprising a movable member extending on either side of the handle and provided with opposing springs for biasing said member in either direction toward a predetermined position relative to the handle, and a retardation device for delaying movement thereof comprising means effective upon operation of said biasing means for effecting an opposing force to limit the rate of movement of said movable member in response to movement of said handle, and means comprising cooperating contact members effective when said lap controlling element is in said predetermined position for holding the electrically operable means in lap position.

10. In a brake equipment for vehicles, electrically operable means for controlling the application and release of the brakes, a brake handle for controlling the energization of said electrically operable means, cooperating contact members effective for initiating operation of said electrically operable means in any service position of the handle, a lap controlling device comprising a movable member extending on either side of the handle and provided with opposing springs for biasing said member in either direction toward a predetermined position relative to the handle, and a retarding device for delaying movement of said member to effect a definite time interval in the movement thereof to said predetermined position following movement of the handle, and means comprising cooperating contact members effective when said lap controlling element is in said predetermined position for holding the electrically operable means in lap position.

11. In a brake equipment for vehicles, electrically operable means for controlling the application and release of the brakes, a brake handle for controlling the energization of said electrically operable means, cooperating contact members effective for initiating operation of said electrically operable means when the handle is positioned in the service application zone, a lap controlling device comprising a movable element, contact members carried thereby, biasing means for biasing said movable element in either direction toward a definite position relative to the handle, and time delay means for retarding the movement of said lap controlling device in either direction to effect a predetermined time interval between movement of said handle and the completion of the resulting movement of said movable element to said definite position, said contact member being effective to maintain circuits for holding the electrically operable means in lap position when said movable element is in said definite position.

12. In a brake equipment for vehicles, electrically operable means for controlling the application and release of the brakes, a brake handle for controlling the energization of said electrically operable means, cooperating contact members effective for initiating operation of said electrically operable means when the handle is positioned in the service application zone, a lap controlling device comprising a movable element, contact means carried thereby, biasing means for urging said movable elements in either direction toward a definite position relative to the handle upon movement of the handle therefrom, and a retardation device for limiting the rate of such movement to provide a time delay that is substantially proportional to the amount of said movement, said contact members being effective to maintain circuits for holding the electrically operable means in lap position when said movable element is in said definite position.

13. In a brake equipment for vehicles, means for controlling the application and release of the brakes, a brake handle for controlling the operation of said means, a lap controlling device comprising a movable element, biasing means for urging said movable element in either direction toward a definite position relative to the handle upon movement of the handle therefrom, and a retardation device for limiting the rate of such movement to provide a time delay that is substantially proportional to the amount of said movement, said lap controlling device being effective for maintaining the brake controlling means in lap position when said movable element is in said definite position.

14. In a brake equipment for vehicles, means for controlling the application and release of the brakes, a brake handle for controlling the operation of said means, a lap controlling device comprising a movable member extending on opposite sides of said handle, biasing means on opposite sides of said handle for centering said movable member with respect to said handle, and a retardation device for limiting the rate of such movement in either direction to provide a time delay that is substantially proportional to the amount of said movement, said lap controlling device being effective for maintaining the brake controlling means in lap position when said movable member is centered with respect to the handle.

GEORGE W. BAUGHMAN.